Nov. 13, 1962

A. C. PETERSON 3,063,574

MATERIAL HANDLING APPARATUS

Filed Jan. 21, 1959

Nov. 13, 1962 — A. C. PETERSON — 3,063,574
MATERIAL HANDLING APPARATUS
Filed Jan. 21, 1959 — 5 Sheets-Sheet 2

Nov. 13, 1962 A. C. PETERSON 3,063,574
MATERIAL HANDLING APPARATUS
Filed Jan. 21, 1959 5 Sheets-Sheet 3

Nov. 13, 1962 A. C. PETERSON 3,063,574
MATERIAL HANDLING APPARATUS
Filed Jan. 21, 1959 5 Sheets-Sheet 4

Nov. 13, 1962 A. C. PETERSON 3,063,574
MATERIAL HANDLING APPARATUS
Filed Jan. 21, 1959 5 Sheets-Sheet 5 ated Nov. 13, 1962

3,063,574
MATERIAL HANDLING APPARATUS
Albert C. Peterson, Park Ridge Manor, Ill., assignor to Union Special Machine Company, Chicago, Ill., a corporation of Illinois
Filed Jan. 21, 1959, Ser. No. 788,107
8 Claims. (Cl. 214—1)

This invention relates to material handling apparatus and more particularly to such apparatus of the type which is adapted to move an object or load from one position to another in an industrial location.

Material handling apparatus of the type to which the present invention is directed is particularly suited for the purpose of raising, lowering and transporting heavy objects from one position to another. Thus, for example, such apparatus may be used to remove a heavy casting or other object from a work truck or dolly and place it on a machine tool, into a spray booth or heat treating furnace, into a storage bin, etc.

In the great majority of uses for apparatus of this type, it is desirable that an affirmative control be exercised over the rate of movement of the transported object from one position to another and over the precise location to which the object is to be moved. Heretofore it has been difficult for an operator to accurately control the speed of the apparatus, with the result that the rate of movement of the transported object occasionally was excessive or was so slow that efficient operation was impaired. Also, primarily because of the location and type of control means employed, it was difficult to move the object to a precise location. In addition, in the use of apparatus of this type, difficulties were encountered in the successive movement of a plurality of objects varying widely in weight.

One general object of this invention, therefore, is to provide a new and improved material handling apparatus which is particularly adaptable for moving an object or load from one position to another in an industrial location.

More specifically, it is an object of this invention to provide such an apparatus in which the speed of an object carried thereby may be affirmatively controlled at all times during the transporting operation.

Another object of this invention is to provide such an apparatus wherein an object carried thereby can be moved to a predetermined position with great accuracy while affording maximum convenience in the control thereof.

Still another object of the invention is to provide a material handling apparatus utilizing comparatively simple mechanical elements which apparatus is economical to manufacture and thoroughly reliable in operation.

In one illustrative embodiment of this invention, a material handling apparatus comprises a piston and rod therefor connected to an overhead support, an elongated, closed cylinder disposed about the piston and movable with respect thereto, the piston and one end of the cylinder defining a pressure chamber therebetween, a material receiving element in rigid relationship to the cylinder, a control handle positioned adjacent the material receiving element, and valve means operable by the handle for controlling a fluid under pressure admitted to or discharged from the pressure chamber.

In accordance with one feature of this invention, the design of the valve means is such that the force exerted on the control handle by an operator is proportional to the rate of movement of the material receiving element, thereby permitting an affirmative control of the speed of an object thereon. Additionally, the force applied to the control handle that is necessary to produce a given object speed may be adjusted for the convenience of the operator, and, if desired, the maximum permissible object speed may be limited.

In accordance with another feature of the invention, the particular construction of the valve means permits the exercise of an extremely fine control over the rate at which the pressure fluid is admitted to or discharged from the pressure chamber, with the result that the object to be transported can be moved to a predetermined position with great accuracy.

In accordance with a further feature of the invention, the control handle is maintained in substantial alignment with the material receiving element, thus affording maximum convenience in ascertaining the position of the object thereon during the transporting operation.

The present invention as well as further objects and features thereof will be understood more clearly and fully from the following detailed description of a preferred embodiment thereof, when read in conjunction with the accompanying drawings, in which.

Figure 2:
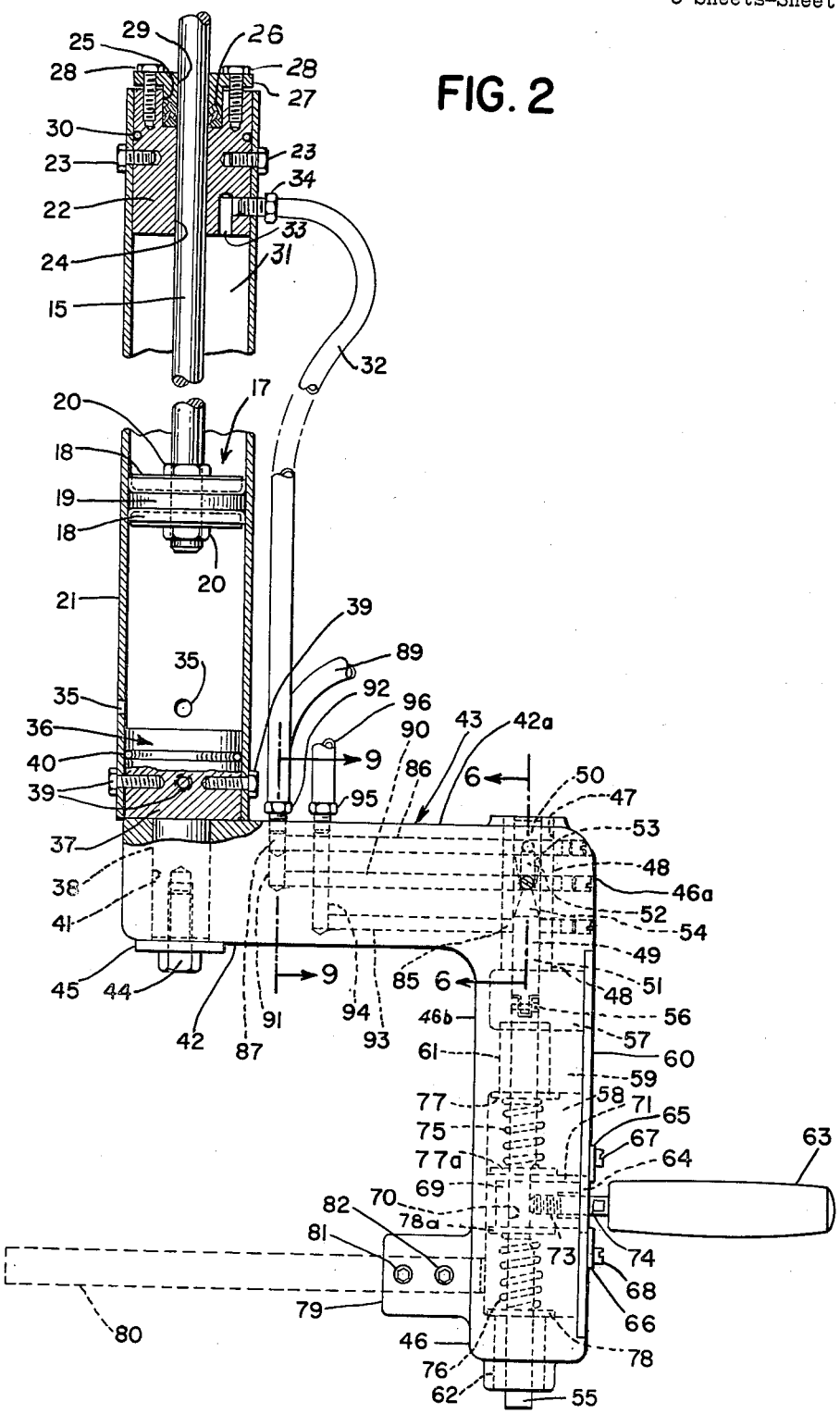
FIGURE 2 is an enlarged detail fragmentary view, partially in section, of the apparatus shown in FIGURE 1.

Referring now to the drawings in detail, there is shown an elongated piston rod 15 which is suspended at one end thereof from an overhead support indicated generally at 16. As best shown in FIGURE 2, a piston 17 is affixed to the other end of rod 15 and includes two dish-shaped members 18 which are disposed axially on the rod 15 on either side of a washer 19. The members 18 and the washer 19 are held in fixed relation to each other and to the rod 15 by means of nuts 20 which are positioned on threaded portions of rod 15 on either side of the piston assembly.

Figure 1:
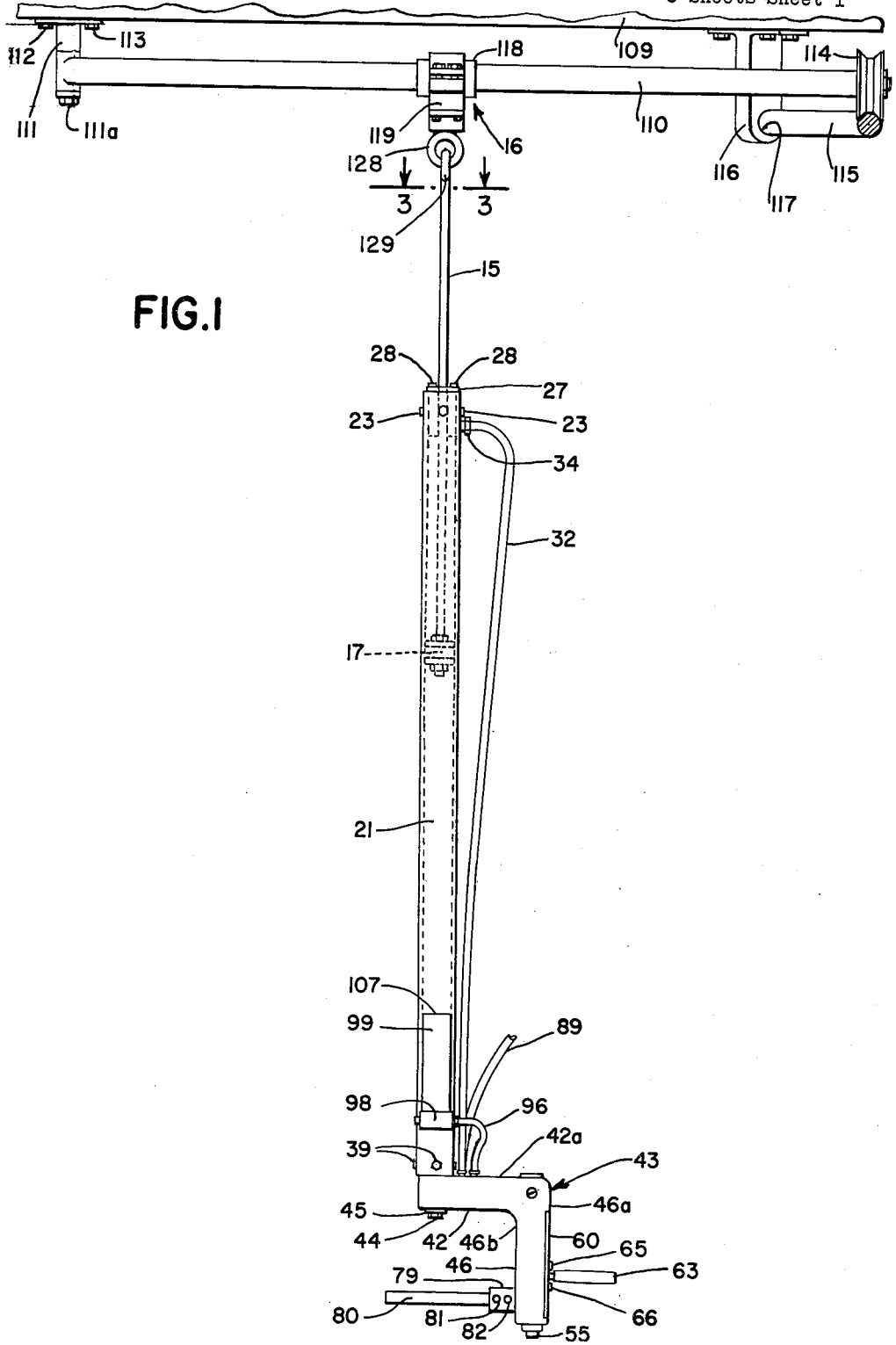
FIGURE 1 is a side view of an apparatus which is illustrative of a preferred embodiment of the invention.
Figure 5:
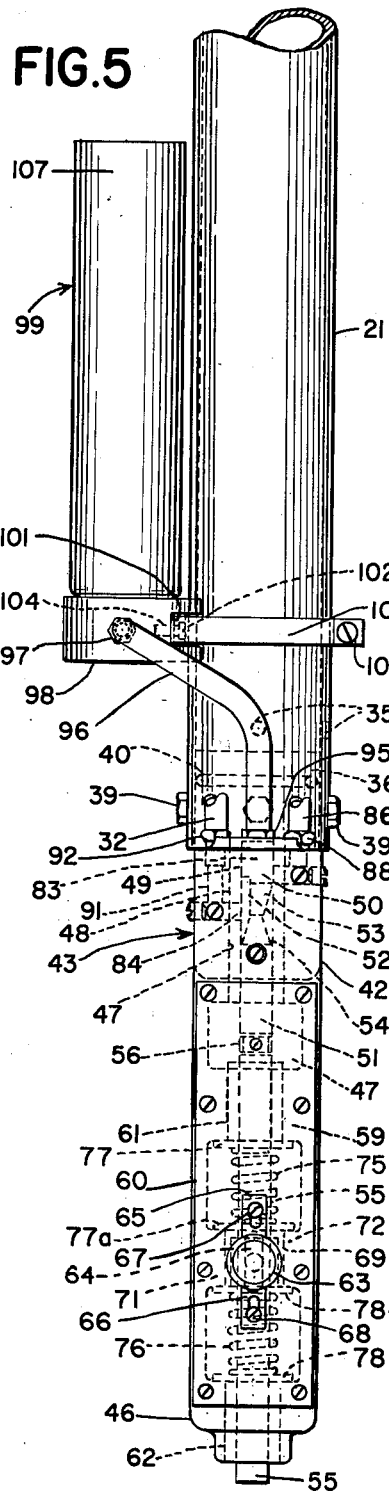
FIGURE 5 is a front view of the lower portion thereof.

The piston 17 is disposed in an elongated cylinder 21 which is movable in a vertical direction, as viewed in FIGURES 1, 2 and 5 of the drawings, with respect to piston 17. The upper end of the cylinder 21 is closed by means of a head 22 disposed within cylinder 21 and held in place by machine screws 23 or other suitable means. The head 22 includes an axial bore 24 which is adapted to receive the piston rod 15 and additionally includes a recess 25 in the upper surface thereof for the purpose of accommodating packing material 26 and a plate 27. The packing material 26 is disposed around the piston rod 15 for the purpose of providing a substantially air-tight seal between rod 15 and the head 22 and is held in place by the plate 27 which is affixed to the upper surface of head 22 by machine screws 28. Plate 27 has an axial bore 29 that forms an extension of the bore 24 in head 22 and accommodates the piston rod 15. Head 22 is maintained in air-tight relationship with the interior side wall of the cylinder 21 by means of an O-ring 30 of conventional construction which is disposed in a circumferential groove in head 22.

The head 22, the interior side wall of cylinder 21 and the piston 17 thus define a pressure chamber 31 which is maintained in open communication with one end of a tube or hose 32 by means of a duct 33 and a nipple 34. Duct 33 is disposed in the head 22 and extends vertically from the interior surface thereof, as viewed in FIGURE 2, into communication with nipple 34. Nipple 34 protrudes from the exterior side wall of cylinder 21 and is connected to the upper end of the tube or hose 32.

A plurality of vent apertures 35 extend through the side wall of cylinder 21 below the lowermost relative position of piston 17 and are in open communication with the atmosphere. The lower end of cylinder 21 is closed by means of a head 36 having one portion 37 thereof substantially coextensive with and disposed within the cylinder 21 and having another portion 38 thereof depending from the lower end of cylinder 21. The portion 37 of head 36 is maintained in substantially air-tight relationship with the cylinder 21 by means of machine screws 39 and an O-ring 40 which is disposed in a circumferential groove in the portion 37.

The depending portion 38 of the head 36 is positioned within an aperture 41 adjacent the outer end of one arm 42 of an L-shaped frame member 43 and is held in rigid relationship with respect thereto by means of a machine screw 44 and a cooperating washer 45. Aperture 41 extends in a direction perpendicular to the longitudinal direction of the arm 42, and thus the head portion 38, the head portion 37 and the cylinder 21 are disposed axially at right angles to arm 42.

The other arm 46 of the L-shaped frame member 43 extends in a direction opposite but substantially parallel to the longitudinal direction of cylinder 21 and has an axial bore 47 extending through the upper portion thereof. This bore accommodates a valve cylinder 48 and corresponding valve 49. The cylinder 48 is press-fitted or otherwise rigidly held in position in the bore 47.

Figure 7:
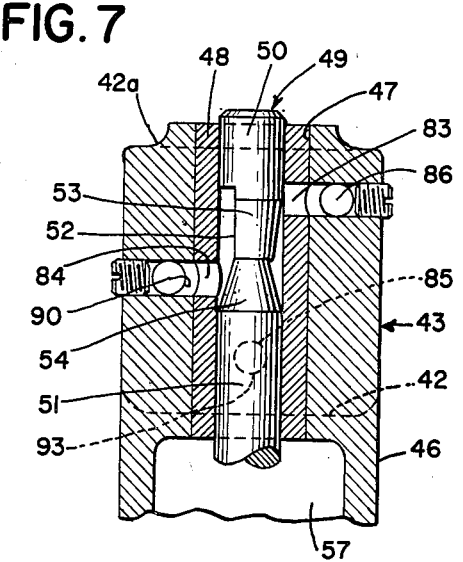
FIGURE 7 is a sectional view similar to FIGURE 6 but illustrating portions of the apparatus in a raising position.
Figure 8:
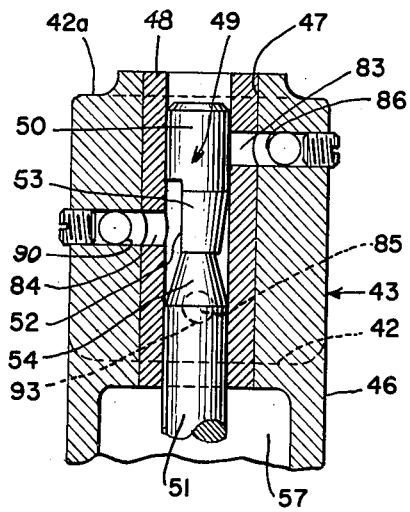
FIGURE 8 is a sectional view similar to FIGURE 6 but illustrating portions of the apparatus in a lowering position.
Figure 6:
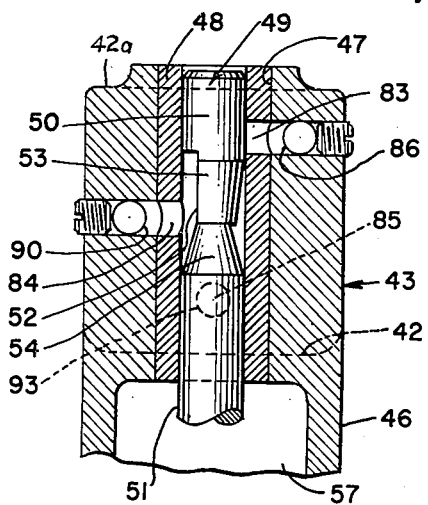
FIGURE 6 is a sectional view taken along the lines 6—6 in FIGURE 2.
Figure 9:
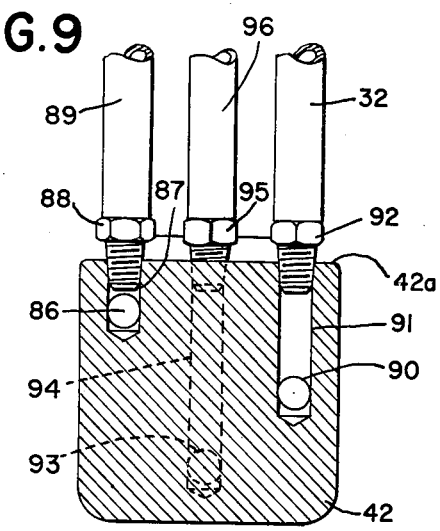
FIGURE 9 is a sectional view taken along the lines 9—9 in FIGURE 2.

As shown in detail in FIGURES 6, 7 and 8, valve 49 includes an upper portion 50 and a lower portion 51 which are axially aligned in abutting relationship with each other and are of a diameter substantially equal to the inside diameter of the cylinder 48. Elongated tapers 53 and 54 are disposed on the upper portion 50 and on the lower portion 51, respectively, at the adjacent ends thereof, and the degree of taper of the taper 54 is slightly greater than that of the taper 53, for purposes that will appear hereinafter. The diameter of valve 49 adjacent the tapers 53 and 54 is somewhat less than the inside diameter of valve cylinder 48, and thus an air space is formed between the tapers 53 and 54 and the interior wall of the cylinder 48. The volume of this air space is increased by cutting away a section of valve 49 adjacent the taper 53 to form a substantially flat surface 52 thereon which extends in a vertical plane, as viewed in the drawings.

Valve 49 is mounted for reciprocatory movement within the valve cylinder 48 and is controlled by means of a valve stem 55 (FIGURE 2) which is positioned in the arm 46 of frame member 43 in axial alignment with valve 49. The lower portion 51 of valve 49 is connected to the upper end of the stem 55 by an overlapping tongue arrangement and a screw 56 or by other suitable means. An upper recess 57 in one side wall 46a of the arm 46 of frame 43 extends inwardly beneath the bore 47 and is in the region of the overlapping tongue arrangement to permit ready accessibility for lubrication, maintenance purposes, etc. The side wall 46a of arm 46 is additionally provided with a lower recess 58 that similarly extends inwardly beneath the bore 47 and is separated from upper recess 57 by means of a ledge 59. Recesses 57 and 58 are closed by a removable cover plate 60 on arm 46 which is secured to the side wall 46a thereof in any suitable manner, as by screws.

Bearing members 61 and 62 are positioned in the ledge 59 and in the lower end of arm 46, respectively, for the purpose of permitting reciprocatory movement of the valve stem 55. The bearing members 61 and 62 are press-fitted or otherwise affixed in the arm 46. Bearing members 61 and 62 may be similar in construction to that shown in FIGURES 10 and 11, the details of which will be described hereinafter in connection with the description of the bearing member employed in the overhead support 16.

A control handle 63 extends into the recess 58 through an elongated, oval shaped aperture 64 in the cover plate 60, as shown in FIGURES 2 and 5. The aperture 64 extends in a direction parallel to the longitudinal direction of the valve stem 55, while handle 63 protrudes from cover plate 60 and extends in a direction normal to that of stem 55. The handle 63 is positioned in rigid but adjustable relationship with the valve stem 55 by means of a bracket 69 in recess 58. Stem 55 extends through a vertically disposed aperture 70 in bracket 69, while a tapped hole 73 intersecting the aperture 70 at right angles accommodates a threaded end 74 of handle 63. Rotation of handle 63 in one direction causes the threaded end 74 in hole 73 to abut against a flat surface on the valve stem 55 and thereby maintain stem 55, bracket 69 and handle 63 in rigid relationship with each other. Rotation of handle 63 in the opposite direction, on the other hand, serves to retract the end 74 from the flat surface on stem 55 and permits movement of the valve stem 55 and hence valve 49 relative to the handle 63. In this manner, the position of valve 49 in the valve cylinder 48 may be quickly and easily adjusted. As will be described in detail hereafter, movement of handle 63 in a vertical direction may be limited by adjustable stop plates 65 and 66 which are affixed to the cover plate 60 adjacent the ends of aperture 64 by machine screws 67 and 68, respectively, cooperating with vertically elongated openings (not shown) in the stop plates.

The bracket 69 is located in the recess 58 between two ledges 71 and 72 (FIGURE 5) which protrude inwardly from opposite interior side walls of the arm 46 and have a vertical thickness, in an axial direction, that is slightly greater than that of the bracket 69. In addition to serving as a guide for vertical movement of bracket 69, the ledges 71 and 72 provide endwise support for two coil springs 75 and 76 when the handle 63 is in its central position. The spring 75 is disposed around stem 55 in recess 58 between a washer 77 adjacent the bearing member 61 and a washer 77a which rests on the upper horizontal surfaces of ledges 71 and 72. Spring 76 is likewise disposed around the stem 55 in recess 58 and is positioned between a washer 78 adjacent the bearing 62 and a washer 78a which abuts the lower horizontal surfaces of ledges 71 and 72.

Extending from a boss 79 (FIGURE 2) on a side wall 46b opposite the side wall 46a of the arm 46 is an elongated rod 80 which comprises the material receiving element of one embodiment of the invention. The rod 80 is positioned in substantially axial alignment with the control handle 63 and is maintained in rigid relation with the arm 46 of frame member 43 by means of set screws 81 and 82 in the boss 79.

As shown most clearly in FIGURES 6, 7 and 8, the valve cylinder 48 is provided with an intake port 83, a delivery port 84, and an exhaust port 85. The intake port 83 is disposed in the upper portion of cylinder 48 and is in open communication with one end of an elongated duct 86 (FIGURES 2 and 3) which extends in the arm 42 in a direction substantially parallel to the longitudinal direction thereof. The other end of the elongated duct 86 communicates with a somewhat shorter duct 87 in which is fitted an intake nipple 88 extending upwardly from wall 42a of arm 42. The nipple 88 is affixed to one end of a tube or flexible hose 89, the other end of which is connected to a suitable air-pressure supply (not shown).

The delivery port 84 is positioned in the central portion of the valve cylinder 48 adjacent the surface 52 of valve 49. Port 84 is in open communication with the interior of the valve cylinder 48 and with one end of an elongated duct 90 extending in the arm portion 42 in a direction parallel to that of the duct 86. The other end of duct 90 communicates with a shorter duct 91 in which is fitted a nipple 92 extending upwardly from the wall 42a of arm 42 adjacent the intake nipple 88. Nipple 92 is connected to one end of the hose 32, the other end of which is secured to the nipple 34 leading to the pressure chamber 31, as described heretofore.

The exhaust port 85 of valve cylinder 48 is disposed in the lower portion thereof and communicates with one end of an elongated duct 93 extending in arm portion 42 in a direction parallel to that of ducts 86 and 90. The other end of the elongated duct 93 is in open communication with a somewhat shorter duct 94 which extends through the top wall 42a of arm portion 42 and is connected to an exhaust nipple 95 adjacent the intake nipple 88 and the pressure nipple 92.

Figure 3:
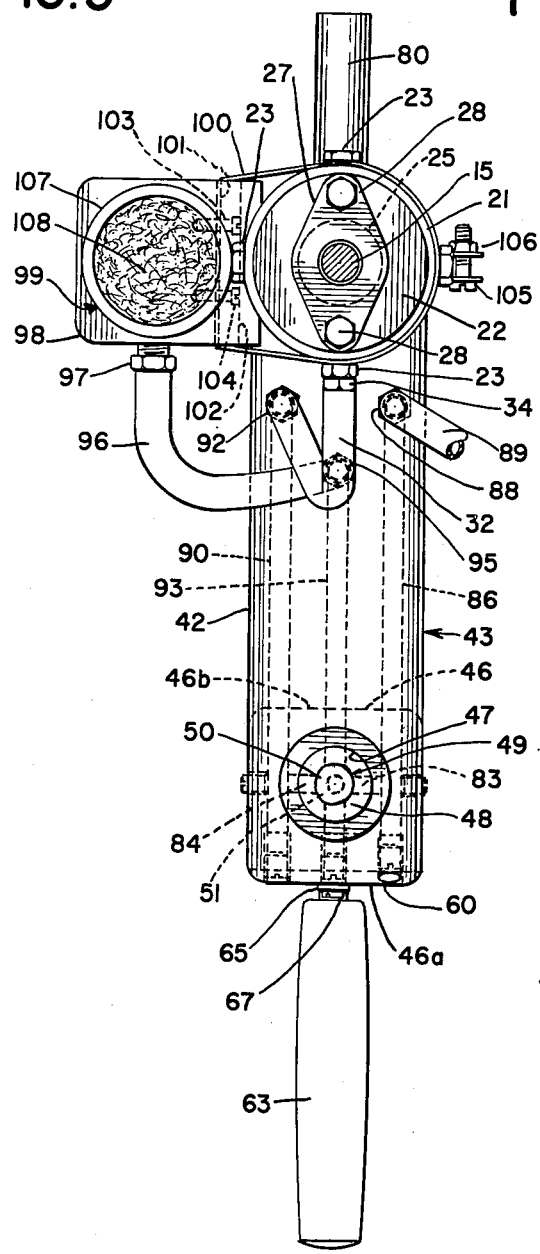
FIGURE 3 is a sectional view taken along the lines 3—3 in FIGURE 1.
Figure 4:
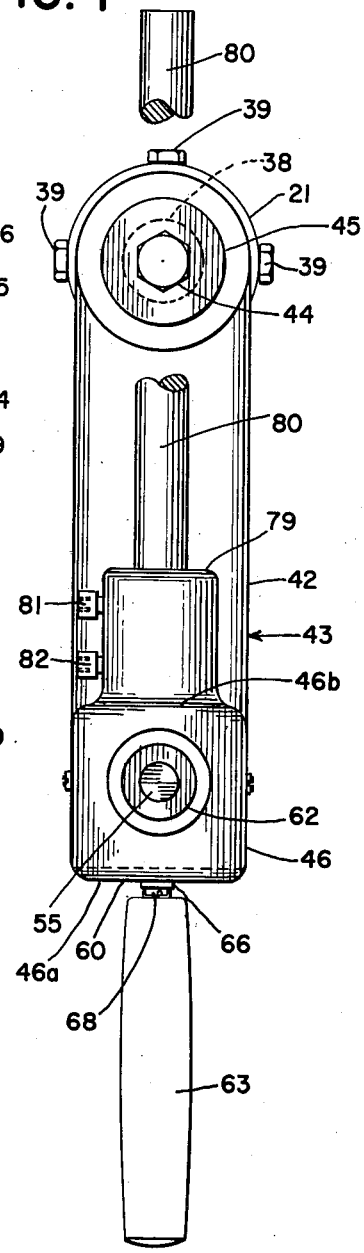
FIGURE 4 is a bottom view thereof with the material receiving element broken away in part and with the supporting structure omitted.

If desired, the nipple 95 may simply exhaust the air from the chamber 31 directly into the atmosphere at the appropriate time. However, to eliminate the noise incident to such exhaust, a tube or hose 96 is affixed at one end to the nipple 95 and at the other end to a nipple 97 in a lower portion 98 of a muffler 99, as best shown in FIGURES 3 and 5. The muffler 99 is rigidly affixed to the elongated cylinder 21 by a strap 100, the central section of which is positioned in a recess 101 in the lower portion 98 of muffler 99 and is secured thereto by a fastening member 102. The fastening member 102 is inserted in the recess 101 and is held against strap 100 by two machine screws 103 and 104 or by other suitable means. The ends of strap 100 extend around the elongated cylinder 21 and are clamped together by a bolt 105 and a cooperating nut 106. The upper portion 107 of muffler 99 is substantially cylindrical in shape and is open to the atmosphere at its upper end. It is packed with sound absorptive or muffling material such as steel wool 108.

In the normal, unoperated position of the apparatus described above, the piston rod 15 and other associated parts, such as the elongated cylinder 21, the frame 43, the handle 63 and the work receiving element 80 depend from the support 16. The number of coils and the forces exerted by the coil springs 75 and 76 in the lower recess 58 of frame 43 are such that the valve stem 55 maintains valve 49 in the position shown in detail in FIGURE 6. In this position, the upper portion 50 of valve 49 effectively closes the intake port 83 and thereby prevents compressed air from entering the valve cylinder 48 through the flexible hose 89, the nipple 88, ducts 87 and 86 and port 83.

In order to move an object from one location to another, the material receiving rod 80 is placed in juxtaposition to the particular object to be moved. It may, for example, be inserted in an opening in a heavy casting or the like. If it is desired to raise the object on the rod 80, the handle 63 is likewise raised, together with the bracket 69, the valve stem 55 and valve 49 attached thereto. When the upper horizontal surface of bracket 69, as viewed in FIGURES 2 and 5, comes in contact with the washer 77a, the spring 75 begins to compress and provides a resistance to the movement of these parts. Upward movement of the valve 49 causes the taper 53 on the upper portion 50 of valve 49 to approach the intake port 83 in valve cylinder 48, as shown in FIGURE 7. A small quantity of compressed air is thus admitted to the pressure chamber 31 (FIGURE 2) in the elongated cylinder 21, the air following a path from the intake hose 89, the nipple 88, ducts 87 and 86, through the intake port 83, past the taper 53, into the valve cylinder 48, and out through the delivery port 84, ducts 90 and 91, nipple 92, hose 32, nipple 34, and duct 33 in the head 22, to the pressure chamber 31. The resulting air pressure in chamber 31 acts against the piston 17 and the head 22 to move the elongated cylinder 21 in an upward direction, thereby raising the frame 43, the receiving rod 80 and the object positioned thereon. The air in cylinder 21 below piston 17 escapes through vents 35 during this upward movement.

If the upward force applied to the handle 63 against the resistance of spring 75 is increased, valve 49 will be shifted upwardly to a greater extent, and an increasingly greater portion of the intake port 83 will be exposed to the interior of the valve cylinder 48. Thus, air is admitted more rapidly to the pressure chamber 31, and the upward speed of the transported object is increased. If the upward movement of valve 49 carried the lower end of taper 53 to about the center line of the intake port 83, air ordinarily would be admitted to the interior of valve cylinder 48 at a maximum rate. This maximum rate of flow of air into the chamber 31 is prevented, however, since the taper 54 on the lower portion 51 of valve 49 begins to close the delivery port 84 before the taper 53 is carried up to the point indicated. Thus, an upper limit is placed on the maximum rate of flow of air into the chamber 31 and hence on the maximum lifting speed of the transported object.

If desired, this maximum permissible speed may be further limited at the convenience of the operator by means of the stop plate 65. The machine screw 67 thereon may be loosened and the plate 65 may be moved in a vertical direction, as permitted by the elongated opening therein, to limit the upward movement of handle 63 and hence valve 49. By proper adjustment of the plate 65, the maximum upward speed of the apparatus may be adjusted to any convenient value and may be conformed to the weight of the particular object being transported. Thus, for objects of relatively light weight, plate 65 may be moved in a downward direction in close proximity to the handle 63, thereby preventing handle 63 and valve 49 from opening the intake port 83 to such an extent that the air admitted to chamber 31 causes the transported object to move at an excessive upward speed. For relatively heavy objects, on the other hand, the plate 65 may be moved upwardly to permit the introduction of air at a faster rate into the chamber 31, since the heavier load will maintain the air under greater pressure within the chamber.

To reduce the upward speed of the object carried by the rod 80, the upward force applied to the control handle 63 is reduced. The spring 75 thus causes the valve stem 55 and the valve 49 to move in a downward direction relative to the valve cylinder 48. Air is thus delivered at a slower rate from the intake port 83 to the delivery port 84. When handle 63 is released, the bracket 69 is automatically returned to its initial position between the protruding ledges 71 and 72 by means of the spring 75, and the relative positions of the valve 49 and the valve cylinder 48 return to those shown in FIGURE 6, thereby closing the intake port 83 and preventing further upward movement of the object on rod 80.

The lower portion 51 of valve 49 prevents compressed air from escaping from the pressure chamber 31 through the exhaust port 85 during upward movement of valve 49 as well as in the normal, unoperated position thereof. Thus, when the handle 63 is released and the spring 75 returns valve 49 to the position shown in FIGURE 6, sufficient compressed air remains in the pressure chamber 31 to maintain the object carried by the rod 80 in its elevated position.

To lower the object on rod 80 (FIGURE 2), a downward force is exerted on the handle 63, causing the spring 76 to compress and the valve stem 55 and valve 49 to move in a downward direction relative to the valve cylinder 48. As the taper 54 on the lower portion 51 of valve 49 approaches the exhaust port 85, as shown in FIGURE 8, a quantity of compressed air passes from the pressure chamber 31 and the duct 33, through the nipple 34, the hose 32, the nipple 92, ducts 91 and 90, port 84, exhaust port 85, ducts 93 and 94, nipple 95, hose 96, and nipple 97 to the muffler 99. This compressed air then flows through the steel wool 108 in the upper portion 107 of muffler 99 to the atmosphere. The resulting pressure reduction in chamber 31 lowers the elongated cylinder 21 and the transported object on the receiving rod 80.

If the downward force on the handle 63 is increased, valve 49 will continue its downward movement relative to the valve cylinder 48, and the increasingly greater portion of exhaust port 85 that is exposed to the interior of valve cylinder 48 will permit air to escape from the pressure chamber 31 more rapidly. By means of the particular construction of valve 49 and of the force exerted by spring 76, the downward speed of the object on rod 80 is at all times proportional to the downward force exerted on handle 63. The maximum downward speed may be limited by proper adjustment of the stop plate 66, the operation of which is substantially the same as described heretofore with respect to the stop plate 65.

To decrease the downward speed of the object on the receiving rod 80, the downward force applied to the control handle 63 is reduced. The spring 76 acts against the washer 78a and bracket 69 to cause the valve stem 55 and the valve 49 to move in an upward direction relative to the valve cylinder 48, and the taper 54 on the lower portion 51 of valve 49 restricts a greater portion of the exhaust port 85. Thus, the air will pass from the pressure port 84 through the exhaust port 85 at a slower rate, and the downward speed of cylinder 21 will be reduced. When the handle 63 is released, the spring 76 automatically returns the valve 49 to the position shown in FIGURE 6, closing exhaust port 85 and preventing the further escape of air from chamber 31. The remaining column of air in chamber 31 supports the object on the rod 80 and holds it in its lowered position.

The apparatus may thus be said to operate on the so-called "servo-principle" in that the sense and magitude of the lifting or lowering force applied to the object on rod 80 follows the sense and magnitude of the force exerted on the control handle 63. This latter force is always proportional to the rate of movement of the transported object during operation of the control handle 63 between the limits of the stop plates 65 and 66.

The tapers 53 and 54 on upper and lower portions 50 and 51, respectively, of valve 49 permit the exercise of a fine control over the speed of the transported object on rod 80. Thus, tapers 53 and 54 pass a gradually increasing quantity of compressed air from the intake port 83 to the pressure chamber 31 or from the latter to the exhaust port 85, respectively. Since in the usual case the pressure of the fluid at the intake port 83 is greater than that at the exhaust port 85, the degree of taper of the taper 53 advantageously is less than that of the taper 54 in order that the rate of delivery of air by the intake port 83 or the exhaust port 85 may be substantially the same for a given upward or downward force exerted on the handle 63. Of course, in situations where upward and downward speed uniformity is neither necessary nor desirable, in cases where substantially the same fluid pressure appears at both the intake port 83 and the exhaust port 85, etc., the degree of taper of the tapers 53 and 54 may be the same.

The flat surface 52 on taper 53 adjacent the delivery port 84 increases the volume of air space in the valve cylinder 48 and thereby prevents the taper 53 from unduly restricting fluid flow at the delivery port 84. Thus, in the illustrated embodiments of the invention, the upward or downward speed of the cylinder 21 and hence of the transported object is determined primarily by the passage of fluid through the intake port 83 or the exhaust port 85, as restricted by the tapers 53 and 54, respectively. The relative position of tapers 53 and 54 with respect to these ports is in turn dependent upon the position to which the control handle 63 is moved between the limits of stop plates 65 and 66, and thus the cylinder 21 reacts quickly and accurately in response to movement of handle 63.

In certain embodiments of the invention, particularly in cases where the degree of taper of the tapers 53 and 54 is the same, a flat surface similar to the surface 52 advantageously may be employed on the taper 54 as well as on the taper 53 in order that the volume of air space in cylinder 49 both above and below the delivery port 84 will be approximately the same when the valve 49 is in its unoperated (FIGURE 6) position. In addition, particularly where relatively slow object speeds are desirable, the design of valve 49 may be such that the volume of air space in cylinder 48 formed by the surface 52 is reduced from that shown in the drawings to provide any desired amount of restriction of the delivery port 84, thereby impeding the flow of fluid through this port. For some applications, the surface 52 may be omitted entirely from the valve 49 without departing from the spirit and scope of the invention.

Figure 14:
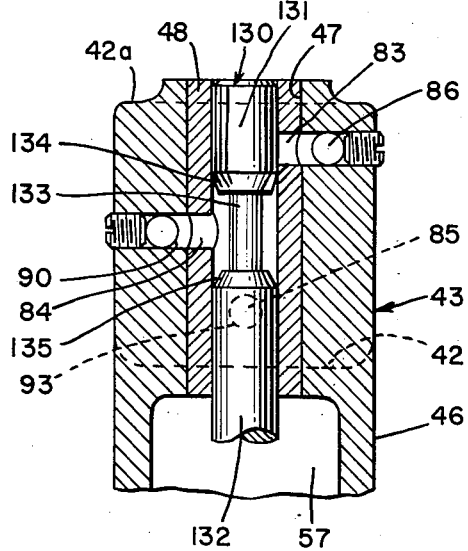
FIGURE 14 is a sectional view similar to FIGURE 6 but illustrating an alternative valve element that may be used in connection with the invention.

FIGURE 14 is illustrative of an alternative valve 130 that for some applications may be substituted for the valve 49 (FIGURE 6). The valve 130 includes an upper portion 131 and a lower portion 132 which are of a diameter substantially equal to the inside diameter of the cylinder 48 and are separated from each other by means of a central portion 133 of a diameter that is considerably less than the inside diameter of cylinder 48. Tapers 134 and 135, which are somewhat shorter than the tapers 53 and 54 of valve 49, are disposed on the upper portion 131 and on the lower portion 132, respectively, adjacent the ends of the central portion 133.

The valve 130 is adapted to be mounted in the valve cylinder 48 and is supported by the valve stem 55 (FIGURE 2). In its unoperated position, the upper portion 131 of valve 130 effectively closes the intake port 83 while the lower portion 132 effectively closes the exhaust port 85, thereby preventing the flow of fluid to or from the interior of the valve cylinder 48. In this position, the central portion 133 of valve 130 is located adjacent the delivery port 84, and thus the port 84 is in open communication with the interior of the cylinder 48.

The mode of operation of the valve 130 in many respects is similar to that of the valve 49 described heretofore. Upward movement of valve 130 in response to the control handle 63 causes the upper portion 131 to expose an increasingly greater portion of the intake port 83 to the interior of the valve cylinder 48. Thus, air is admitted at an increasing rate to the pressure chamber 31 in cylinder 21, and the upward speed of the transported object is increased. Upon downward movement of the valve 130, an increasingly greater portion of the exhaust port 85 is exposed to the interior of valve cylinder 48 and the increased flow of air from the delivery port 84 to the exhaust port 85 causes the downward speed of the transported object to increase. The upward or downward speed of the transported object is at all times proportional to the upward or downward force exerted on the control handle 63.

As shown in FIGURE 14, the degree of taper of the taper 134 advantageously is less than that of the taper 135. Thus, in one illustrative example, the degree of taper of the taper 134 has been made 2 degrees while that of the taper 135 has been made 5 degrees for a pressure at the intake port 83 of 90 pounds per square inch. Of course, other suitable taper configurations and intake pressures may be employed without departing from the spirit and scope of the invention. Additionally, where a fine control over the speed of the transported object on rod 80, in relation to the force applied to handle 63, is neither necessary nor desired, the portions 131 and 132 of the valve 130 of FIGURE 14 need not be provided with the tapered surfaces 134 and 135.

Referring now to FIGURE 1 of the drawings, there is shown a form of support member 16 which is particularly advantageous in suspending the apparatus described heretofore from an overhead structure such as a ceiling 109. The support member 16 comprises an enlongated bar 110 that is mounted for swinging movement in a plane parallel to the ceiling 109 about a pivot pin or stud 111 at one end of bar 110. The pin 111 is affixed to the ceiling by bolts 112 and 113 and is screw threaded at its lower end to receive a nut 111a.

A sheave 114 is rotatably positioned at the other end of the bar 110 and is adapted for rolling motion along the top of an arcuate track member 115. The member 115 may be in the form of a complete circle with the pivot bearing 111 at the geometric center thereof, or, as shown in FIGURE 1, it may define any desired segment of such a circle. Member 115 is suspended from the ceiling 109 by suitable brackets, such as the bracket 116 which has an aperture 117 adjacent the depending end thereof in which the member 115 is inserted. A similar bracket may be provided at the opposite end of member 115 and appropriate intermediate brackets may be provided if needed.

Slidably positioned intermediate the ends of the elongated bar 110 is a bearing member 118 that is clamped or otherwise rigidly affixed to a depending eye 128 by a bracket 119 (FIGURE 1) of conventional construction. The eye 128 is interconnected with a mating eye 129 formed in the upper end of the piston rod 15, thereby enabling the rod 15 to pivot freely about the bracket 119.

Figure 10:
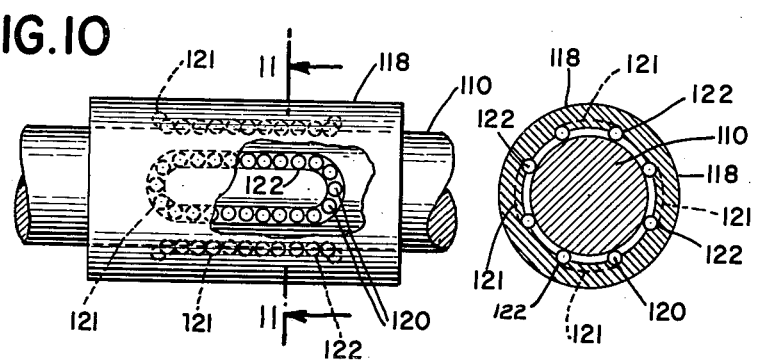
FIGURE 10 is a side view, partially broken away, of a bearing member useful in connection with the apparatus of FIGURE 1.
Figure 11:
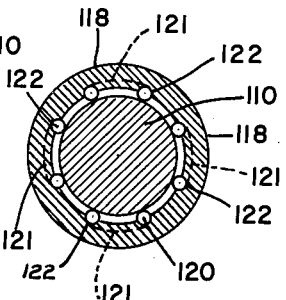
FIGURE 11 is a sectional view taken along the lines 11—11 in FIGURE 10.

The bearing member 118, as shown in detail in FIGURES 10 and 11, is substantially in the form of a hollow cylinder and has the inner surface thereof separated from the bar 110 by ball bearings 120. The bearings 120 substantially fill four elongated raceways 121, each of which comprises an oval groove cut into the inner surface of bearing member 118. One of the longitudinal side portions 122 of each raceway 121 is substantially shallower than the remaining portions thereof, and the bearings 120 are of a diameter such that only the bearings which are contained in the shallower portions 122 of raceways 121 at any moment will have bearing contact with both of the opposing surfaces of the bar 110 and bearing member 118. Thus, as the bearing member 118 is moved longitudinally with respect to the bar 110, the ball bearings 120 are discharged one at a time from one end of each of the shallower portions 122 and are carried around the respective oval raceways 121 to the opposite end of portions 122, where they are pushed into bearing contact with the opposing surfaces of bar 110 and bearing member 118. As the bearing member 118 is rotated with respect to bar 110 without longitudinal movement, the bearings 120 remain in their relative positions in raceways 121.

The support 16 permits movement of the material receiving rod 80 and associated parts in any desired direction. Thus, the rod 80, frame 43, cylinder 21 and piston rod 15 may be swung about the elongated bar 110 or may be moved longitudinally along bar 110. Additionally, the bar 110 may be swung about the pivot pin 111, the sheave 114 following the path of the arcuate member 115. The particular design of the support 16 enables the apparatus to be moved quickly and easily in any desired sequence or combination of the above motions. The material receiving rod 80 may thus be readily inserted in an aperture in the object to be transported.

Figure 12:
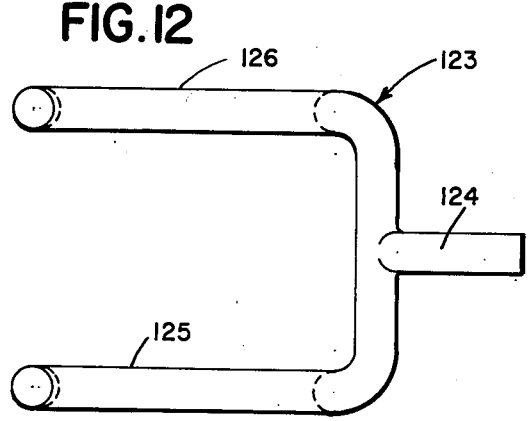
FIGURE 12 is a top plan view of an alternative material receiving element that may be employed in connection with the invention.
Figure 13:
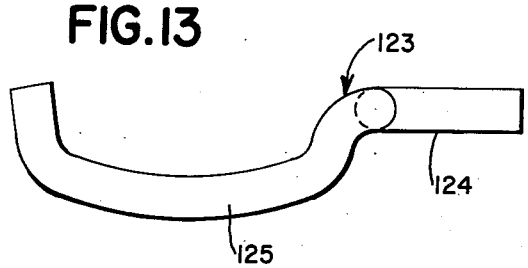
FIGURE 13 is a side view of the element shown in FIGURE 12.

Referring now to FIGURES 12 and 13 of the drawings, there is shown an alternative material receiving element 123 that is particularly useful in cases where the transported object cannot be readily supported by a rod-like element 80. The element 123 is substantially fork-shaped and includes a relatively straight shank 124 and two arcuate tines 125 and 126. The tines 125 and 126 are curved in an upward direction, as viewed in FIGURE 13, and are adapted to engage the under surface of an object to be transported. The shank 124 may be inserted in the boss 79 (FIGURE 2) in place of the rod 80 and is similarly held in position by the set screws 81 and 82.

The terms and expressions which have been employed are used as terms of description and not of limitation, and there is no intention, in the use of such terms and expressions, of excluding any equivalents of the features shown and described, or portions thereof, it being recognized that various modifications are possible within the scope of the invention claimed.

What is claimed is:

1. A load handling device of the type operable by fluid pressure, comprising, in combination, a support member, a vertically disposed piston rod having one end thereof pivotally connected to said support member, a piston affixed to the other end of said rod, an elongated cylinder disposed about said piston and movable with respect thereto, said elongated cylinder being closed at the upper end thereof and having a vent adjacent the lower end thereof, said piston and said upper end of said elongated cylinder defining a pressure chamber therebetween, a material receiving element carried by the lower end of said elongated cylinder, a manually operable control member carried by said cylinder adjacent said material receiving element and movable upwardly and downwardly with respect to said element, valve means operable in response to the upward and downward movements of said control member for controlling the movement of said elongated cylinder and said material receiving element relative to said piston, said valve means including a valve cylinder having an inlet duct, an exhaust duct, and an outlet duct located between said inlet duct and said exhaust duct and in open communication with said pressure chamber, said valve means also including a valve element disposed within said valve cylinder and connected to said control member, said valve element having a substantially flat surface thereon normally disposed adjacent said outlet duct in a plane parallel to the longitudinal axis of said valve cylinder, and means for delivering a continuous supply of fluid under pressure to said inlet duct, movement of said valve element in response to the application of a force to said control member in an upward direction connecting said inlet duct with said outlet duct to admit said fluid under pressure to said pressure chamber and thereby cause said elongated cylinder and said material receiving element to move in said upward direction at a rate proportional to said upwardly directed force, movement of said valve element in response to the application of a force to said control member in a downward direction connecting said exhaust duct with said outlet duct to permit discharge of said fluid under pressure from said pressure chamber and thereby cause said elongated cylinder and said material receiving element to move in said downward direction at a rate proportional to said downwardly directed force, whereby the upward and downward movements of said control member cause corresponding upward and downward movements of said elongated cylinder and said material receiving element.

2. In a material handling apparatus of the type operable by fluid under pressure, a valve cylinder including an inlet duct in communication with a source of fluid under pressure, an exhaust duct, an outlet duct positioned between said inlet duct and said exhaust duct, a control valve element disposed within said cylinder and movable with respect thereto, said valve element including a first section normally adjacent said inlet duct and a second section in axial alignment with said first section and normally adjacent said exhaust duct, each of said sections including a cylindrical main body portion having a diameter substantially equal to the inside diameter of said cylinder and including a tapered portion, the degree of taper of the tapered portion of one of said sections being less than the degree of taper of the tapered portion of the other of said sections, and means for moving said valve element relative to said cylinder in one direction to position said tapered portions adjacent said inlet duct and said outlet duct to permit the passage of fluid pressure between said inlet duct and said outlet duct and for moving said valve element relative to said cylinder in another direction to position said tapered portions adjacent said exhaust duct and said outlet duct to permit the passage of fluid under pressure from said outlet duct to said exhaust duct, the extent of movement of said valve element in each of said directions serving to determine the rate of flow of the fluid in said valve cylinder.

3. In a material handling apparatus of the type operable by pneumatic pressure, a valve cylinder having an inlet duct in communication with a supply of gas under pressure, an exhaust duct in communication with the atmosphere and an outlet duct positioned between said inlet duct and said exhaust duct, a control element disposed within said cylinder and movable with respect thereto, said element including a first section normally adjacent said inlet duct to close off the same and a second section in axial abutting alignment with said first section and normally adjacent said exhaust duct to close off the same, each of said sections including a cylindrical main body portion having a diameter substantially equal to the inside diameter of said cylinder and including a tapered portion adjacent the abutting ends of said sections in the region of said outlet duct, the tapered portion of one of said sections including a substantially flat surface normally disposed adjacent said outlet duct in a plane parallel to the longitudinal axis of said valve cylinder, and means for moving said control element relative to said cylinder in one direction to position said tapered portions adjacent said inlet duct and said outlet duct to permit the admission of gas under pressure to said outlet duct from said inlet duct and for moving said control element relative to said cylinder in another direction to position said tapered portions adjacent said exhaust duct and said outlet duct to permit the discharge of gas under pressure from said outlet duct to the atmosphere.

4. In a material handling apparatus of the type operable by fluid pressure; a valve cylinder having an inlet duct in communication with a supply of fluid under pressure, an exhaust duct and an outlet duct positioned between said inlet duct and said exhaust duct; a control element disposed within said cylinder and adapted for reciprocatory movement with respect thereto, said element including a first section of circular cross section normally adjacent said inlet duct and a second section of circular cross section in axial alignment with said first section and normally adjacent said exhaust duct, each of said sections including a main body portion having a diameter substantially equal to the inside diameter of said cylinder and including a tapered portion normally disposed in the region of said outlet duct, the degree of taper of the tapered portion of said first section being less than the degree of taper of the tapered portion of said second section; spring means operatively associated with said control element for normally retaining the same in a central position; and a manually operable control handle in rigid relationship with said element, said handle being adapted to move said element relative to said cylinder in one direction to position said tapered portions adjacent said inlet duct and said outlet duct to permit the admission of fluid under pressure to said outlet duct from said inlet duct, the extent of movement of said element in said one direction in response to said handle determining the rate of fluid flow to said outlet duct, and said handle being adapted to move said element relative to said cylinder in an opposite direction to position said tapered portions adjacent said exhaust duct and said outlet duct to permit the discharge of fluid from said outlet duct to said exhaust duct, the extent of movement of said element in said opposite direction in response to said handle determining the rate of fluid flow to said exhaust duct.

5. In a material handling apparatus of the type operable by pneumatic pressure; a valve cylinder having an inlet duct in communication with a supply of air under pressure, an exhaust duct in communication with the atmosphere, and an outlet duct positioned between said inlet duct and said exhaust duct; a control element disposed within said cylinder and adapted for reciprocatory movement with respect thereto, said element including a first cylindrical section normally adjacent said inlet duct to close off the same, a second cylindrical section in axial abutting alignment with said first section and normally adjacent said exhaust duct to close off the same, each of said sections having a diameter substantially equal to the inside diameter of said cylinder, and said element including tapered portions adjacent the abutting ends of each of said sections in the region of said outlet duct, one of said tapered portions including a substantially flat surface normally disposed adjacent said outlet duct in a plane parallel to the longitudinal axis of said valve cylinder; spring means operatively associated with said element for resisting said reciprocatory movement in either direction from normal; manually operable means for moving said element relative to said cylinder in one direction to position said tapered portions adjacent said inlet duct and said outlet duct to permit the admission of air under pressure to said outlet duct from said inlet duct and for moving said element relative to said cylinder in an opposite direction to position said tapered portions adjacent said exhaust duct and said outlet duct to permit the discharge of air under pressure from said outlet duct to the atmosphere; said spring means including a first coil spring for resisting movement of said control element in said one direction and including a second coil spring for resisting movement of said control element in an opposite direction; and a plurality of stop members in operative relation with said manually operable means for limiting the movement of said control element relative to said cylinder.

6. A material handling apparatus, comprising, in combination, a supporting member, a second member movable relative to and carried by said supporting member, one of said members including an elongated cylinder closed at one end and having a vent adjacent the other end, the other of said members including a piston disposed within said elongated cylinder, said piston and said one end of said cylinder defining a pressure chamber therebetween, a material receiving element affixed to said second member, a manually operable control member positioned adjacent said material receiving element and movable in a first and a second direction in respect thereto, valve means operable by said control member for controlling the movement of said second member and said material receiving element relative to said supporting member, said valve means including a valve cylinder having an inlet duct, an outlet duct in open communication with said pressure chamber, and an exhaust duct, and said valve means including a valve element disposed within said valve cylinder and connected to said control member, said valve element having a first section normally adjacent said inlet duct and a second section in axial alignment with said first section and normally adjacent said exhaust duct, each of said sections including a cylindrical main body portion having a diameter substantially equal to the inside diameter of said valve cylinder and including a tapered portion extending toward the other of said sections, one of said tapered portions including a substantially flat surface normally disposed adjacent said outlet duct in a plane parallel to the longitudinal axis of said valve cylinder, means for continuously supplying fluid under pressure, and means for delivering said fluid to said inlet duct, movement of said valve element in response to the application of a first predetermined force to said control member to move the same in said first direction connecting said inlet duct with said outlet duct to admit said fluid to said pressure chamber and thereby cause said second member and said material receiving element to move in said first direction at a rate proportional to said first force, movement of said valve element in response to the application of a second predetermined force to said control member to move the same in said second direction connecting said exhaust duct with said outlet duct to permit discharge of fluid from said pressure chamber and thereby cause said second member and said material receiving element to move in said second direction at a rate proportional to said second force, whereby the direction of movement of said second member and said material receiving element corresponds to the direction of movement of said control member.

7. A pneumatic load lifting device, comprising, in combination, an overhead support, a vertically disposed piston rod having one end thereof pivotally connected to said support, a piston affixed to the other end of said rod, an elongated cylinder disposed about said piston and movable with respect thereto, said elongated cylinder being closed at the upper end thereof and having a vent adjacent the lower end thereof, said piston and said upper end of said elongated cylinder defining a pressure chamber therebetween, a material receiving element carried by the lower end of said elongated cylinder, a manually operable control member positioned adjacent said material receiving element and movable upwardly and downwardly with respect to said element, valve means operable in response to upward and downward movement of said control member for controlling the movement of said elongated cylinder and said material receiving element relative to said piston, said valve means including a valve cylinder, a valve element connected to said control member and adapted for reciprocatory vertical movement within said valve cylinder, and spring means operatively associated with said valve element for resisting said reciprocatory vertical movement, said valve cylinder having an inlet duct, an outlet duct in open communication with said pressure chamber, and an exhaust duct, said valve element including a first cylindrical section normally adjacent said inlet duct to close off the same and a second cylindrical section in axial alignment with said first section and normally adjacent said exhaust duct to close off the same, each of said sections having a diameter substantially equal to the inside diameter of said valve cylinder and having an inwardly tapered extension extending toward the other of said sections, the tapered extension of said first section including a substantially flat surface normally disposed adjacent said outlet duct in a plane parallel to the longitudinal axis of said valve cylinder and the tapered extension of said second section having a degree of taper greater than the degree of taper of the tapered extension of said first section, and means for delivering a continuous supply of air under pressure to said inlet duct, movement of said valve element in response to the application of an upwardly directed force to said control member against said spring means connecting said inlet duct with said outlet duct to admit said air under pressure to said pressure chamber and thereby cause said elongated cylinder and said material receiving element to move in said upward direction at a rate proportional to the magnitude of said upwardly directed force, movement of said valve element in response to the application of a downwardly directed force to said control member against said spring means connecting said exhaust duct with said outlet duct to permit discharge of said air under pressure from said pressure chamber and thereby cause said elongated cylinder and said material receiving element to move in said downward direction at a rate proportional to said downwardly directed force, whereby the upward and downward movements of said control member cause corresponding upward and downward movements of said elongated cylinder and said material receiving element.

8. A load handling device comprising a supporting member, a second member movable up and down along said supporting member, a load carrying element secured to said second member, means for supplying power to said second member for causing upward movement of said second member relative to said supporting member, means associated with said power supplying means for causing said second member to move downwardly along said supporting member, control means carried by said second member and reciprocally movable upwardly and downwardly relative thereto, and valve means responsive to upward and downward movements of said control means for controlling the supply of power and causing corresponding upward and downward movements of said second member along said supporting member, said valve means including a valve cylinder and a valve element reciprocally movable within said cylinder in response to movement of said control means, said valve element having abutting first and second sections which each include a tapered portion at the end thereof adjacent the other of said sections, one of said tapered portions having a substantially flat surface thereon disposed in a plane parallel to the longitudinal axis of said valve cylinder.

References Cited in the file of this patent

UNITED STATES PATENTS

| | | |
|---|---|---|
| 715,715 | Weber | Dec. 9, 1902 |
| 2,391,881 | Clay | Jan. 1, 1946 |
| 2,546,362 | Graham | Mar. 27, 1951 |
| 2,574,131 | Steinbrecher | Nov. 6, 1951 |
| 2,617,548 | Falkner | Nov. 11, 1952 |

OTHER REFERENCES

Scientific American (Magazine), July 1946 (page 17).